Dec. 18, 1928.
T. J. McCORMICK
1,696,009
VEHICLE TIRE COVER
Filed July 15, 1927
2 Sheets-Sheet 1
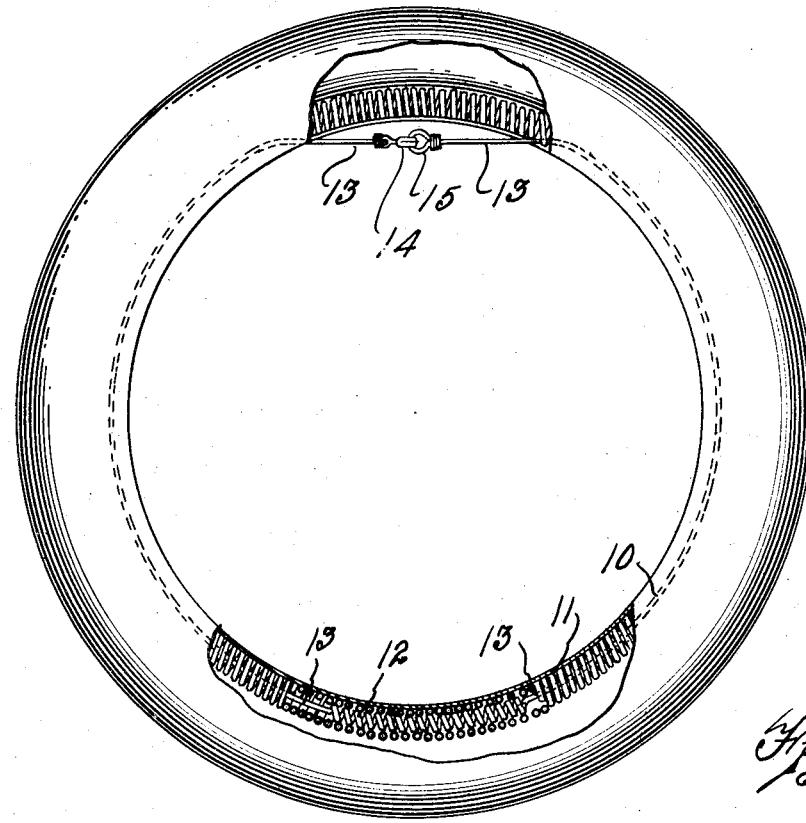
Fig. 1
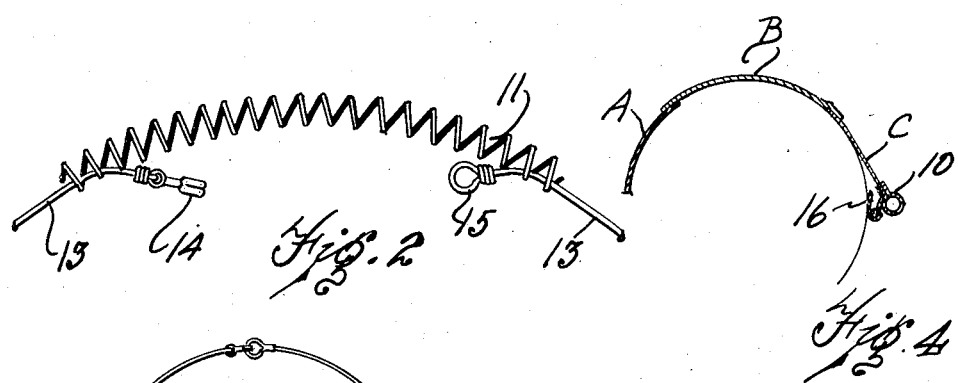
Fig. 2
Fig. 4
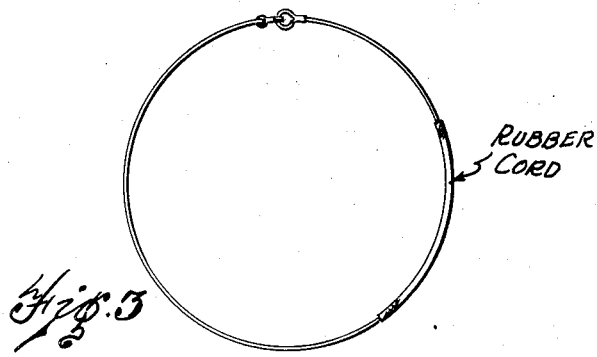
Fig. 3
INVENTOR.
Thomas J. McCormick
BY
Francis O. Hardesty
ATTORNEY.

Dec. 18, 1928.

T. J. McCORMICK

VEHICLE TIRE COVER

Filed July 15, 1927

INVENTOR.
Thomas J. McCormick
BY
Francis O. Hardesty
ATTORNEY.

Patented Dec. 18, 1928.

1,696,009

UNITED STATES PATENT OFFICE.

THOMAS J. McCORMICK, OF DETROIT, MICHIGAN.

VEHICLE TIRE COVER.

Application filed July 15, 1927. Serial No. 205,986.

The present invention relates to vehicle tire covers and more particularly to that type of tire cover which is provided along one free edge with elastic means whereby when the cover is placed upon a tire this free edge is contracted into place to produce a snug close fit.

Heretofore, in tire covers of this type it has been common to include within the hem of such a free edge a coil spring made into an endless band or ring by uniting its ends. It has also been common to use, instead of such a spring, an elastic cord with its ends secured together in suitable fashion.

Such structures, particularly the larger sizes, are always difficult to install or remove owing to the fact that the elastic member necessarily must be rather strongly resistant to stretching and is several inches less in diameter than the tire over which it must be passed.

Another proposal that has been made is to use a puckering string but this is open to the objection that it is impossible, with the stiff water-proof cloth, to contract the free edge tightly and uniformly and then to fasten the free ends securely against coming loose.

Among the objects of the present invention is to overcome the difficulties mentioned and provide a contracting means which shall have all of the advantages of the coil spring or elastic cord contracting element and shall at the same time not interfere with the putting on or taking off of the cover.

Other objects will readily occur to those skilled in the art upon reference to the following description and accompanying drawings in which:—

Fig. 1 is a view in elevation of a tire enclosed in one form of a tire cover embodying the invention, parts being broken away;

Fig. 2 is an enlargement of a part of Fig. 1;

Fig. 3 is a view of a detail of a modification;

Fig. 4 is a section showing one of the features of the cover of Fig. 1;

Figure 5:
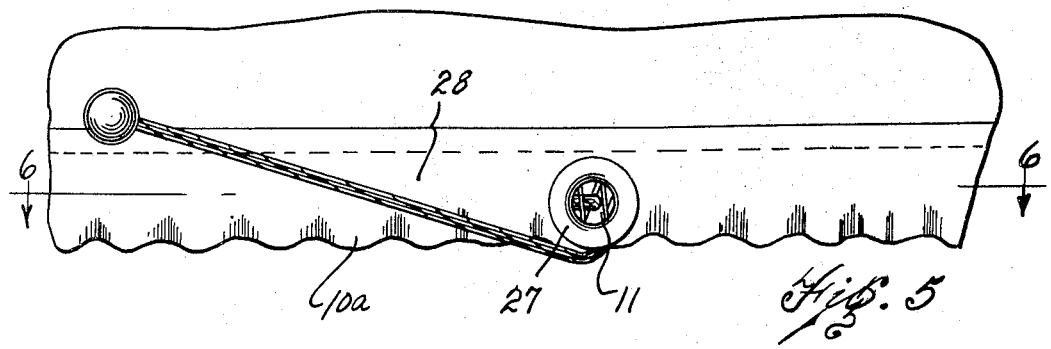
Fig. 5 is a partial elevation of another modification.

In Fig. 1 is illustrated more or less conventionally a common form of tire cover consisting of several strips of fabric sewed together at their edges as illustrated in Fig. 4. The strip A may be, instead of a strip, a circular sheet large enough to cover the opening in the tire, so as to form what is known to the trade as the "drum" type of cover. To this strip or sheet is sewed a tread strip B and to the latter, a third strip C, in the outer edge of which is a hem enclosing, in the usual cover, a spring or other elastic member to contract this edge of the cover and hold it snugly on the tire.

As indicated above, the present invention relates to this contracting element and is not confined in its application to this form of tire cover but may be used in other forms, such, for example, as that shown in United States Letters Patent No. 1,604,527 issued Oct. 26, 1926 to the present applicant.

In the present invention, assuming the form of tire cover mentioned above, the cover is prepared in the usual manner and into the hem 10 of the strip C is sewed a wire spring lining or friction reducing bearing member 11. This spring member should be of very light material offering little, if any, resistance to extension or contraction and serves chiefly as a bearing member for the true contracting element enclosed by it.

Inside of member 11 is placed a short piece of heavy or strong spring 12 having secured to its ends lengths of preferably piano wire 13. The spring 12 is preferably of such length that it extends only a short portion of the total circumference and the wires 13 are sufficiently long to complete the circumference when the cover is in use, they being provided with means such as a hook 14 and eye 15 by means of which the ends may be attached. These ends project through the flights of member 11 at spaced points as shown in Fig. 2, so that, when unhooked they may separate sufficiently to allow the cover to be put on or taken off of a tire without the spring resistance to be overcome. After the cover is in position, these ends 14 and 15 are drawn together and secured, thereby elastically contracting the edge of the cover through the action of spring 12.

As the ends of wires 13 when connected from a chord of the circle, it is preferred to provide a flap of fabric 16 upon hem 10 at this portion of the cover, which flap may be drawn over the exposed wire ends and tucked under as indicated in Fig. 4 so as to effectively conceal the wire and hold the cover at this point.

Instead of spring 12, a short piece of elastic cord 18 may be used as indicated in Fig. 3.

A modification of the above device is shown in Figs. 5 to 8. In these figures the same bearing member 11 is shown but at a suitable point the flights are spread apart and to it at this point by means of a grommet 25 is securely anchored one of the wires 13. It is also preferred to secure a small piece of fabric 26 which serves to protect the outer fabric when the whole is enclosed in the hem 10ª of the cover proper. When the piece 26 has been wrapped around member 11 it is enclosed in the hem 10ª which is also provided with a grommet 27, registering with grommet 25 in the completed cover.

Figure 6:
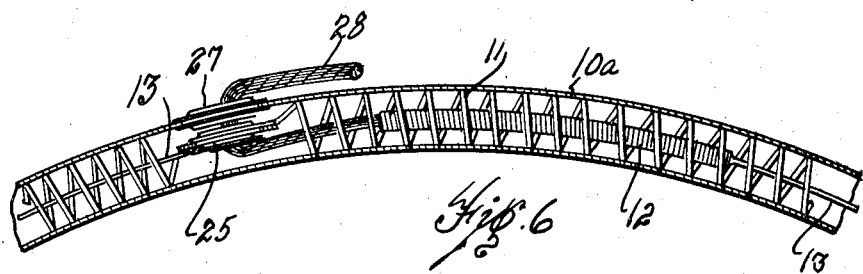
Fig. 6 is a section on line 6—6 of Fig. 5.
Figure 7:
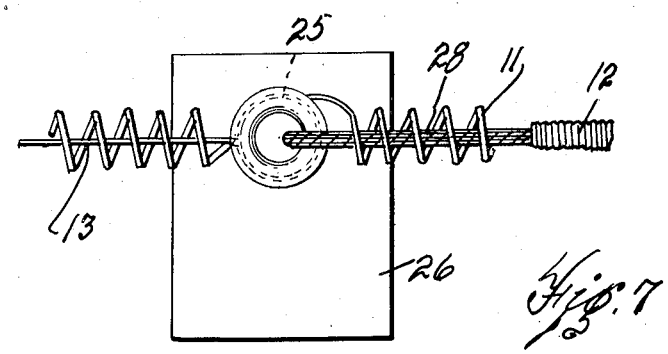
Fig. 7 shows a detail of construction of the form of device shown in Figs. 5 and 6.

In this form of the invention instead of the second wire 13, a short piece of cable 28 is secured to the end of spring 12 and extends out through grommets 25 and 27. This cable 28 is relatively stiff and serves to secure the spring 12 in extended condition when the cover is in use, by bending it back upon itself as indicated in Figs. 5 and 6 and tucking it up under the edge of the cover. The two grommets serve to take the wear and strain from the fabric at these points and also being of substantial thickness prevent bending the cable at so sharp an angle as to rupture it.

Figure 8:
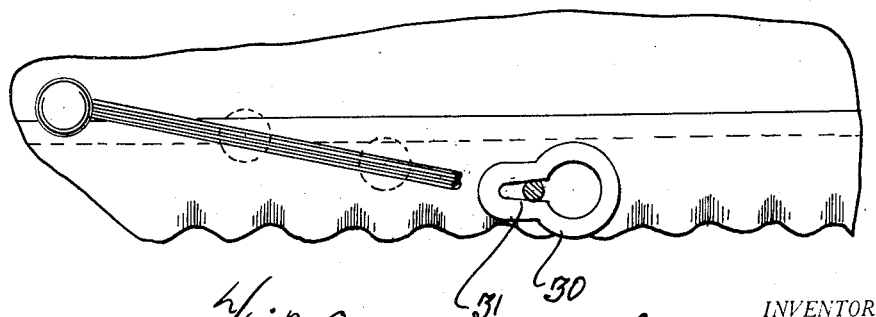
Fig. 8 is a view similar to Fig. 5 of a further modification.

Figure 8 shows a slight modification of the last described form of the invention. In this form, instead of the common round grommet, such as shown at 25 and 27, a keyhole shaped grommet 30 may be substituted for one or both 25 and 27, and it is preferred that the slotted portion 31 of this grommet 30 have its sides inclined as shown, so that the cable 28 will wedge itself into the slot and be firmly held. Or, the cable may be provided with knots or other enlargements 32 at intervals to co-operate with such a grommet. In the latter case, a cord may be used in place of the cable.

In each of the several forms the end of the cable or cord is preferably provided with a ball 35 to prevent its being accidentally drawn entirely with member 11.

Now having described the invention and the preferred forms of embodiment thereof, it is to be understood that the said invention is to be limited, not to the specific details herein set forth, but only by the scope of the claims which follow.

I claim:—

1. In a vehicle tire cover having a free edge adapted to be held contracted by means of an extensible and contractible element, a hem in said free edge, an extensible and contractible friction reducing bearing lining said hem, and an edge contracting element within said lining.

2. In a vehicle tire cover having a free edge adapted to be held contracted by means of an extensible and contractible element, a hem in said free edge, an extensible and contractible friction reducing bearing lining said hem, and an edge contracting element within said lining, said contracting element including a spring portion constituting a portion only of said element.

3. In a vehicle tire cover having a free edge adapted to be held contracted by means of an extensible and contractible element, a hem in said free edge, an extensible and contractible friction reducing bearing lining said hem, and an edge contracting element with said lining, said contracting element including a spring portion constituting a portion only of said element, the remainder being of non-extensible material.

4. In a vehicle tire cover having a free edge adapted to be held contracted by means of an extensible and contractible element, a hem in said free edge, an extensible and contractible friction reducing bearing lining said hem, and an edge contracting element within said lining, said contracting element comprising a relatively short spring element having connected to each end thereof a length of non-extensible material, the total length being slightly less than the circumference of said edge in its contracted position.

5. In a vehicle tire cover having a free edge adapted to be held contracted by means of an extensible and contractible element, a hem in said free edge, an extensible and contractible friction reducing bearing lining said hem, and an edge contracting element within said lining, said contracting element comprising a relatively short spring element having connected to each end thereof a length of non-extensible material, the total length being slightly less than the circumference of said edge in its contracted position, one of said lengths of non-extensible material being releasable at the end away from the spring element whereby the free edge may be greatly expanded without substantial resistance.

6. In a vehicle tire cover having a free edge adapted to be held contracted by means of an extensible and contractible element, a hem in said free edge, an extensible and contractible friction reducing bearing lining said hem, and an edge contracting element within said lining, said contracting element comprising a relatively short spring element having connected to each end thereof a length of non-extensible material, the total length being slightly less than the circumference of said edge in its contracted position, one of said lengths of non-extensible material being anchored to the cover at the end away from the spring element, and the other of said lengths being releasably secured to the cover at substantially the same point.

7. In a vehicle tire cover having a free edge adapted to be held contracted by means of an extensible and contractible element, a hem in said free edge, an extensible and contractible friction reducing bearing lining said hem, and an edge contracting element within said lining, said contacting element comprising a relatively short spring element having connected to one end thereof a length of piano wire extending for a large portion of the circumference of said free edge, means for anchoring the other end of said wire to said lining and to said cover, a length of flexible cable secured to the other end of said spring element, said cable extending from said element to beyond the point of anchorage of said wire and being free from said lining and cover beyond said point, and means for releasably securing said cable at said point whereby to fix the circumferential length of said contracting element.

THOMAS J. McCORMICK.